US006572182B2

(12) United States Patent
Lamparter et al.

(10) Patent No.: US 6,572,182 B2
(45) Date of Patent: Jun. 3, 2003

(54) MOTORIZED VENT AND ESCAPE HATCH ASSEMBLY

(75) Inventors: Ronald C. Lamparter, Grosse Pointe Shores, MI (US); James A. Haigh, Shelby Township, MI (US); Richard J. Iminski, St. Clair Shores, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 09/837,100

(22) Filed: Apr. 18, 2001

(65) Prior Publication Data

US 2002/0153752 A1 Oct. 24, 2002

(51) Int. Cl.$^7$ .................................................. B60J 7/08

(52) U.S. Cl. ...................... 296/216.02; 296/223; 49/340

(58) Field of Search ............................. 296/216.02, 218, 296/223; 49/141, 340

(56) References Cited

U.S. PATENT DOCUMENTS

| 4,021,073 | A | | 5/1977 | Manning | |
|---|---|---|---|---|---|
| 4,412,404 | A | | 11/1983 | Manning | |
| 4,495,731 | A | | 1/1985 | Sears | |
| 4,929,019 | A | * | 5/1990 | Paakkonen et al. | . 296/216.02 X |
| 4,964,673 | A | | 10/1990 | Lamparter | |
| 5,203,113 | A | * | 4/1993 | Yagi | ......................... 49/324 X |
| 5,385,061 | A | * | 1/1995 | Moy et al. | ................. 49/340 X |
| 5,680,728 | A | * | 10/1997 | Moy | .......................... 49/340 X |
| 6,073,995 | A | * | 6/2000 | Klein | ...................... 296/223 X |
| 6,347,484 | B1 | | 2/2002 | Swanger | |

FOREIGN PATENT DOCUMENTS

GB        2195392    *  4/1988   .................. 49/340

* cited by examiner

Primary Examiner—Dennis H. Pedder
(74) Attorney, Agent, or Firm—Reising, Ethington, Barnes, Kisselle, Learman & McCulloch P.C.

(57) ABSTRACT

A motorized vent and escape hatch assembly has a mounting ring fastened to a vehicle roof around a hatch hole, and a hatch cover that is attached to the mounting ring by a first over center hinge linkage mechanism pivotally connecting one side of the hatch cover to the mounting ring and a second over center mechanism pivotally connecting an opposite side of the hatch cover to the mounting ring. Each over center hinge linkage mechanism has first and second lever members pivotally connected to the mounting ring at one end, first and second plungers that are connected to the respective first and second plungers at the opposite end and that extend into opposite ends of a tube that is connected to the hatch cover. A compression spring in the tube biases the first and second plungers away from each other. Each over center hinge linkage mechanism is associated with a drive mechanism that pivots the first and second lever members toward or away from each other to raise or lower its side of the hatch cover with respect to the mounting ring. Each drive mechanism includes first and second gear housings attached to the mounting ring, first and second gear sets disposed inside the respective gear housings, first and second electric motors attached to the respective gear housings for driving the first and second gear sets, and first and second output shafts that are driven by the first and second gear sets and that extend out of the first and second gear housings respectively with the first and second lever members being keyed to the first and second output shafts respectively. The gear sets are compound gear trains that reduce speed and increase torque.

10 Claims, 3 Drawing Sheets

MOTORIZED VENT AND ESCAPE HATCH ASSEMBLY

This invention relates to a combined vent and escape hatch assembly that is adapted for installation in the roof of a vehicle such as a transit bus or a school bus.

BACKGROUND OF THE INVENTION

U.S. Pat. No. 4,021,073 granted to Donald L. Manning May 3, 1977 discloses a combined vent and escape hatch assembly for a vehicle roof in which a hatch cover over a roof opening has over hinge linkage connecting the hatch cover to the roof structure at two opposite sides. The hinge linkage accommodates tilting the hatch cover upwardly in either of two directions or elevating the entire hatch cover to vent the vehicle through the roof opening. The hinge linkage at one side includes provision for separating parts of the hinge linkage to permit swinging the hatch cover fully open to use the roof opening to escape from the interior of the vehicle.

The hatch cover disclosed in the Manning '073 patent is tilted upwardly by manually applying sufficient upward force to the underside of the hatch cover in the mid area at one of the sides that has a hinge linkage so that the hatch cover pivots on the hinge linkage at the opposite side of the hatch cover. The hatch cover is tilted upwardly in the opposite direction by manually applying sufficient force to the underside of the hatch cover in the mid area at the opposite side. The entire hatch cover is elevated by manually applying sufficient force to the mid area of both sides that have hinge linkage connecting the hatch cover to the roof structure. The hatch cover is swung fully open by manually applying an upward force to a spring biased operating arm of a lever that is located near the one side that has separable hinge linkage connecting the hatch cover to the roof structure. The upward force moves the arm and lever separating the hinge linkage at the one side and then swings the hatch cover about the hinge linkage at the opposite side to the filly open position.

U.S. Pat. No. 4,964,673 granted to Ronald C. Lamparter Oct. 23, 1990 discloses an improved vehicle hatch mounting assembly that operates in substantially the same way.

The hatch covers disclosed in the above patents are satisfactory for their intended purpose and have enjoyed substantial commercial success, particularly in the case of the improved version in accordance with the Lamparter '673 patent. However, newer busses, particularly newer transit busses tend to have lower floors, particularly in the forward area of the bus, to accommodate passengers with disabilities. The lower floors increase the roof height which makes manual operation of the hatch covers difficult in many instances.

SUMMARY OF THE INVENTION

This invention provides a motorized vent and escape hatch cover wherein the roof hatch cover can be tilted upward in either direction and elevated entirely with ease. The motorized vent and escape hatch has a mounting ring fastened to a vehicle roof around a hatch hole. A hatch cover is attached to the mounting ring by a first over center hinge linkage mechanism pivotally connecting one side of the hatch cover to the mounting ring and a second over center mechanism pivotally connecting an opposite side of the hatch cover to the mounting ring. Each over center hinge linkage mechanism has first and second lever members pivotally connected to the mounting ring at one end, first and second plungers that are connected to the respective first and second plungers at the opposite end and that extend into opposite ends of a tube that is connected to the hatch cover. A compression spring in the tube biases the first and second plungers away from each other.

Each over center hinge linkage mechanism is associated with a drive mechanism that pivots the first and second lever members toward or away from each other to raise or lower its side of the hatch cover with respect to the mounting ring. Each drive mechanism includes first and second gear housings attached to the mounting ring, first and second gear trains disposed inside the respective gear housings, first and second electric motors attached to the respective gear housings for driving the first and second gear trains, and first and second output shafts that are driven by the first and second gear trains driving and that extend out of the first and second gear housings respectively with the first and second lever members being keyed to the first and second output shafts respectively. The gear trains are compound gear trains that reduce speed and increase torque.

DESCRIPTION OF THE PREFERRED EMBODIMENT

Figure 1:
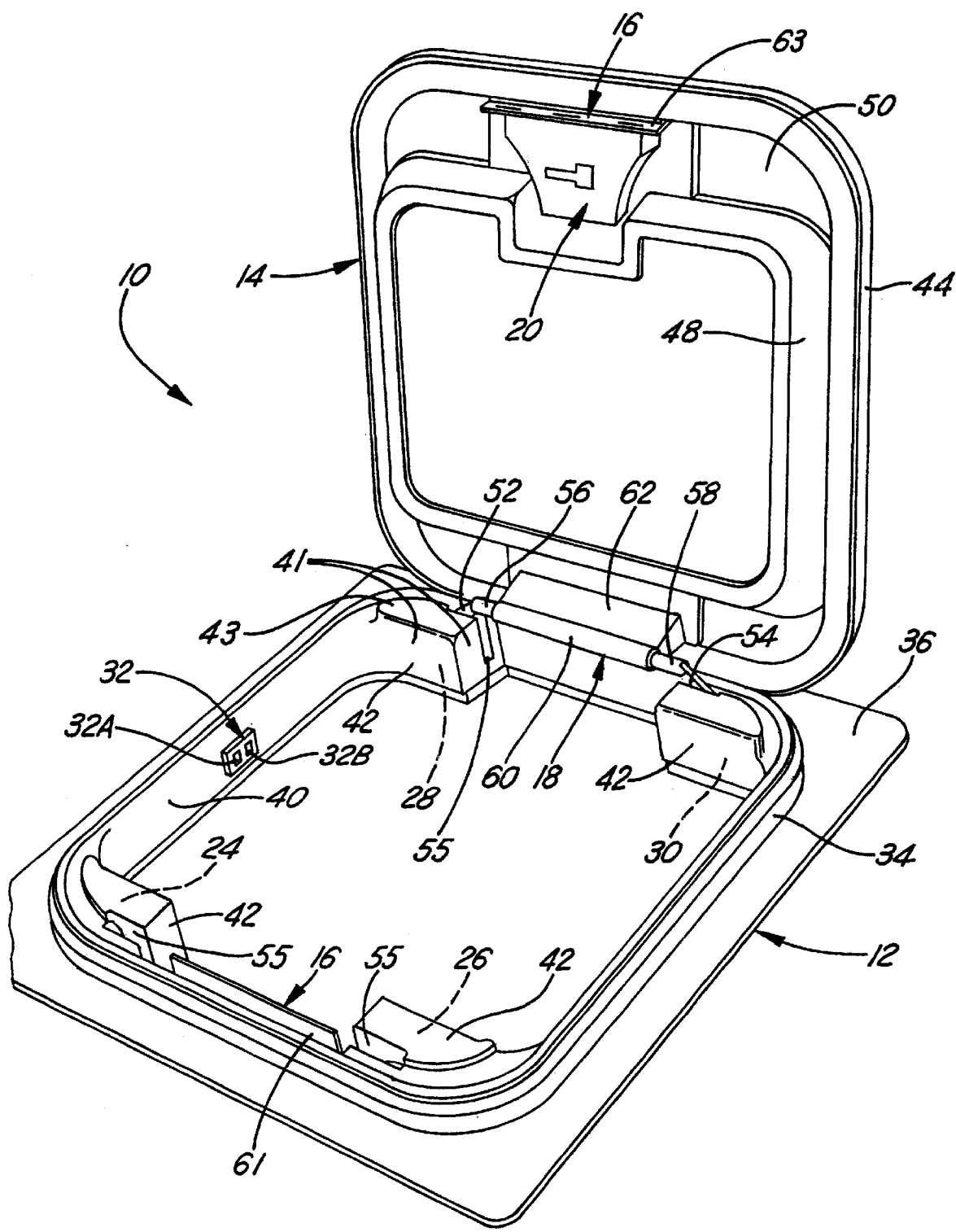
FIG. 1 is a perspective view of a motorized vent and escape hatch assembly with the hatch cover shown in a fully open position.

Referring now to FIG. 1 of the drawing, the vent and escape hatch assembly 10 of the invention comprises a mounting ring 12, a hatch cover 14, and two over center hinge linkage mechanisms 16 and 18 that connect the hatch cover 14 to the mounting ring 12 at opposite sides. Separable parts of hinge linkage mechanism 16 are released by a latch mechanism 20 in order to open hatch cover 14 fully as shown in FIG. 1.

Figure 2:
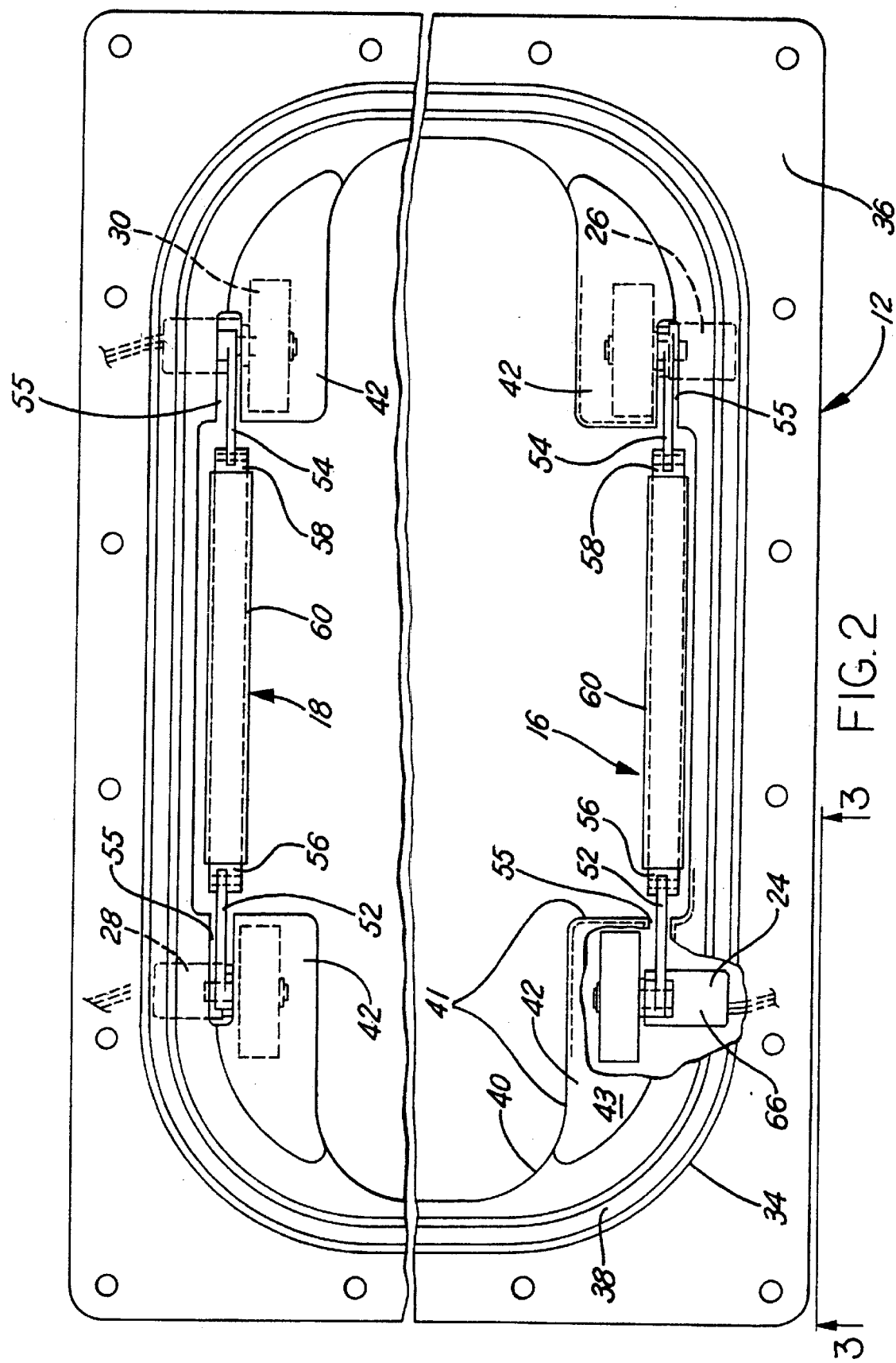
FIG. 2 is a top view of the hatch assembly of figure with parts removed and/or broken away to show internal detail.

Vent and escape hatch assembly 10 includes a drive mechanism 22 for operating the over center hinge linkage mechanisms 16 and 18 to tilt hatch cover 14 in either of two directions. Drive mechanism 22 comprises four drive units 24, 26, 28 and 30 and a control 32. The drive units are located at the respective corners of the rectangular mounting ring 12 inside covers that are formed as an integral part of the mounting ring 12 as indicated in FIG. 1 and explained in detail below. As best shown in FIG. 2, a first drive mechanism comprises drive units 24 and 26 that are associated with over center hinge linkage mechanism 16 while a second drive mechanism comprises drive units 28 and 30 that are associated with over center hinge linkage mechanism 18. Control 32 is also preferably housed in an integral portion of a side wall of mounting ring 12 for on site operation as indicated in FIG. 1 and explained in detail below. It is also desirable to provide a remote control (not shown) that is operable from a remote location such as the instrument panel in front of the driver.

Figures 4, 5:
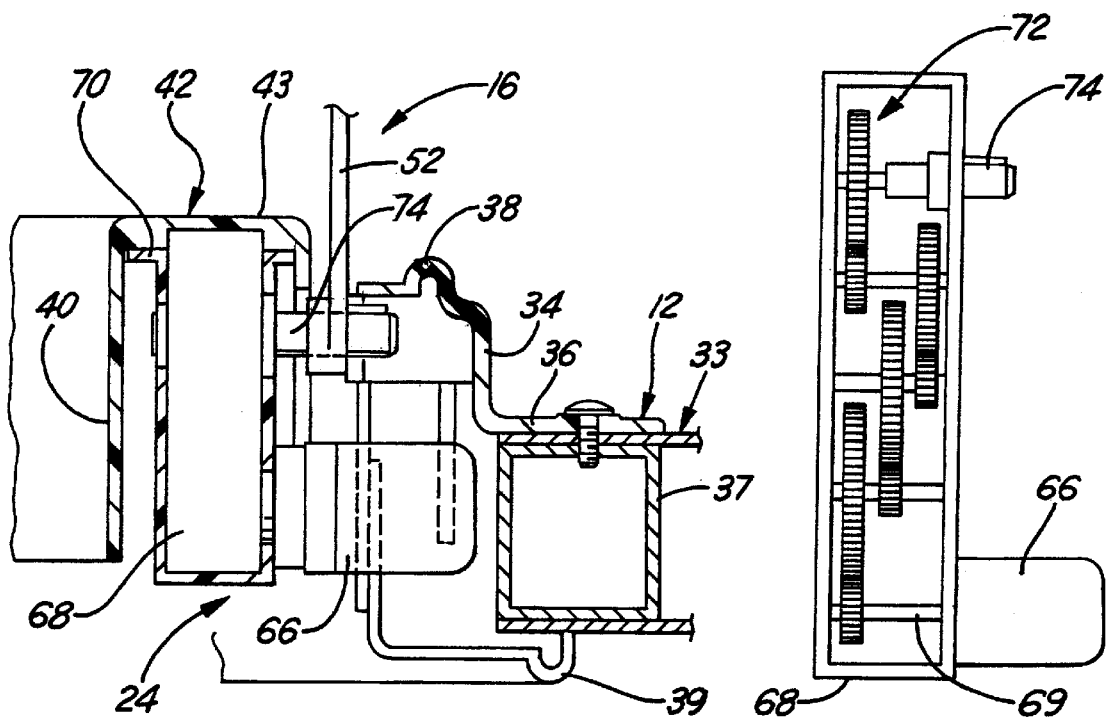
FIG. 4 is a section taken substantially along the line 4—4 of FIG. 3 looking in the direction of the arrows.
FIG. 5 is a schematic drawing of a component of the hatch assembly.

Mounting ring 12 comprises a generally rectangular outer rim 34 with round corners that has an outward flange 36 at the lower end. Flange 36 is used for attaching mounting ring 12 to the roof 33 of a transit bus or the like around a hole 35 that extends through the roof to provide both a vent and an escape hatch as best shown in FIG. 4. Hole 35 may be reinforced by a frame 37 and dressed by an interior bezel rim 39. Mounting ring 12 also has a top wall that includes a continuous rectangular sealing bight 38 with round corners that is above and spaced inwardly from outer rim 34. An inner rim 40 is attached to the top wall inside the sealing bight 38. Inner rim 40 protrudes inwardly at otherwise round corners to provide four rectangularly related side walls for drive unit covers 42 at the respective corners that are formed as an integral part of mounting ring 12. Each cover 42 has two rectangularly related side walls 41 forming part of inner rim 40 and a top wall 43. The unique shape of the mounting ring 12 provides protection for the drive units 24, 26, 28 and 30 while the inner rim 40 maintains a smooth escape passage that does not impair the escape route due to the corner locations of the drive unit covers 42.

Hatch cover 14 comprises a generally rectangular outer rim 44 with round corners and an inward flange 46 at the lower end. Outer rim 44 fits around outer rim 34 of mounting ring 12 and inward flange 46 lies on outward flange 36 of mounting ring 12 when hatch cover 14 is closed. Hatch cover 14 also includes a generally rectangular inner rim 48 with round corners that is spaced from outer rim 44 and fits inside inner rim 40 of mounting ring 12 when hatch cover 14 is closed. A flat sealing surface 50 of hatch cover 14 that is between rims 44 and 48 sealing engages sealing bight 38 on the top wall of mounting ring 12 when hatch cover 14 is closed.

Figure 3:
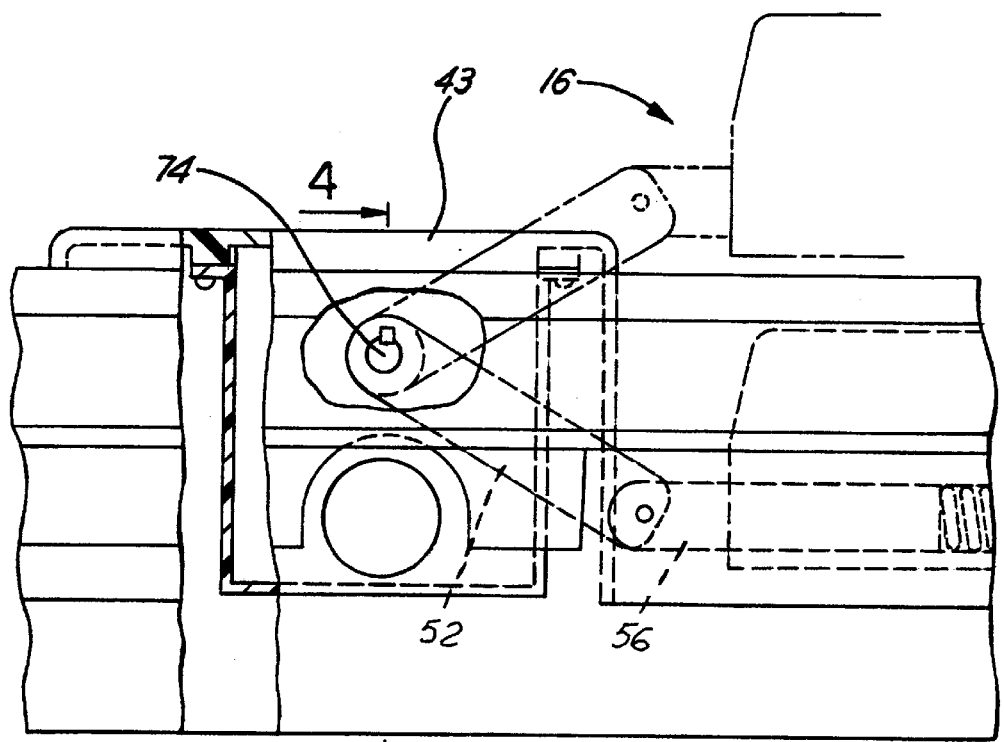
FIG. 3 is a section taken substantially along the line 3—3 of FIG. 2 looking in the direction of the arrows.

As indicated above, two over center hinge linkage mechanisms 16 and 18 connect the hatch cover 14 to the mounting ring 12 at opposite sides. Each over center hinge linkage mechanism includes two lever members 52 and 54 that are connected to a drive unit below one of the covers 42 at their outer ends as best shown in FIGS. 2 and 3. Lever members 52 and 54 extend through slots 55 in their respective covers 42 and are secured at their inner ends to respective plungers 56 and 58 as best shown in FIGS. 1, 2 and 3. Plungers 56 and 58 are disposed in opposite ends of a tube 60 of a hinge bracket 62 that is secured to hatch cover 14 as best shown in FIGS. 1 and 2. A coil compression spring 64 disposed in tube 60 engages the inner ends of the plungers 56 and 58 and pushes the plungers 56 and 58 outwardly and away from each other.

The hinge bracket 62 of hinge linkage mechanism 16 consists of two separable parts 61 and 63 that are held together by latch mechanism 20 which releases part 61 that has the tube 60 from part 63 that is attached to hatch cover 14 in order to open hatch cover 14 fully as shown in FIG. 1. The hinge mechanisms 16 and 18 are otherwise the same. The two part hinge bracket 62 of hinge linkage mechanism 16 and latch mechanism 20 do not need to be described in further detail to understand the invention. However, if further detail is desired, the Manning and Lamparter patents discussed above that describe suitable hinge linkage mechanisms, two part hinges and latch mechanisms in considerable detail, can be consulted. To this end, the Manning and Lamparter patents discussed above are hereby incorporated in this specification by reference.

As indicated above, the vent and escape hatch assembly 10 of the invention includes a drive mechanism 22 for operating the over center hinge linkage mechanisms 16 and 18 to tilt hatch cover 14 in either of two directions. Drive mechanism 20 comprises four drive units 24, 26, 28 and 30 that are substantially identical and a control 32 for operating the drive units 24 selectively. The typical drive unit 24 comprises a bidirectional electric motor 66 that is mounted on a gear housing 68 with its output shaft 69 extending into the gear housing 68. Gear housing 68 is attached to mounting ring 12 inside housing 42 in any suitable manner. For example, by a bracket 70 attached to top wall 43 as best shown in FIG. 4. Gear set 72 which is disposed in a gear housing 68 is driven by output shaft 69 of electric motor 66 and includes an output shaft 74. Gear set 72 reduces the speed and increases the torque of output shaft 74. In this particular example the gear set 72 which is shown schematically in FIG. 5 is a compound gear train that includes several compound gears that reduce the speed and increase the torque of output shaft 74 in four stages.

The outer end of lever member 52 is keyed to output shaft 74 so that lever member 52 is rotated between a retracted position shown in dashed line in FIG. 3 and an extended position shown in phantom line in FIG. 3. Drive units 26, 28 and 30 are identical to drive unit 24. Drive unit 26 rotates lever member 54 of hinge linkage mechanism 16 between retracted and extended positions. Drive units 28 and 30 drive lever members 52 and 54 of hinge linkage mechanism 18 respectively between these two positions.

As shown in FIGS. 4 and 5 the typical electric motor 66 of each of the four drive units 24, 26, 28 and 30 is attached to a first or outer side of the gear housing 68 and the output shaft 74 also extends out of the first or outer side of the gear housing 68 with the electric motor 66 attached to the first or outer side of the gear housing 68 below the output shaft 74.

The four motors of the four drive units 24, 26, 28 and 30 are controlled by control 32 that is preferably mounted on the inner rim 40 of mounting ring 12 to provide convenient access to the control. Motor controls are well known in the art and need not be described in detail. Any suitable motor control may be used that operates the motors of the respective drive units to tilt hatch cover 14 in either direction or to elevate the entire hatch cover 14 as desired by the operator and to return the hatch cover to the closed position from any of the selected positions. For convenience control 32 is illustrated with two toggle switches 32A and 32B having up, neutral and down positions.

Hatch cover 14 is tilted in one direction by toggling switch 32A to the up position which energizes and drives the motors of drive units 24 and 26 in synchronization to rotate lever members 52 and 54 simultaneously in opposite directions from their respective retracted positions to their respective extended positions. The motors of drive units 28 and 30 are not energized during this time so that the forward end of hatch cover 16 is raised while the rearward end pivots on plungers 56 and 58 of hinge linkage assembly 18. During this movement lever members 52 and 54 initially drive plungers 56 and 58 of hinge linkage assembly 16 inwardly against the action of compression spring 64 until lever members 52 and 54 align coaxially with plungers 56 and 58 at a center position. Once the inner ends of lever members 52 and 54 rotate past center, compression spring 64 urges plungers 56 and 58 outward thus assisting in completing the tilting of the hatch cover 14.

Hatch cover 14 is closed by toggling switch 32A to the down position reversing the motors of drive units 24 and 26 to return their respective lever members 52 and 54 to the retracted position. When closing hatch cover 14, compression spring 66 of hinge linkage assembly 16 initially resists closure but then assists in the closure after an over center condition is achieved. It should be noted that the motors of hinge linkage assembly 16 can be deenergized at any time to stop the opening or the closing procedure so that the hatch cover 14 can be tilted part way in the one direction.

Hatch cover 14 is tilted in the opposite direction by energizing the motors of drive units 28 and 30 via toggle switch 32B to operate hinge linkage assembly 18 to raise the rearward end of hatch cover 14 while the motors of drive units 24 and 26 remain deenergized Hatch cover 14 is closed from this position by reversing the motors of drive units 28 and 30 by toggling switch 32B to the down position. As before the motors can be deenergized at any time so that hatch cover 14 can be tilted part way in this opposite direction.

The entire hatch cover 14 is elevated by energizing the motors of all four drive units which raises the front and rear ends hatch cover 14 at the same time. Since the motors can be deenergized at any time the hatch cover 14 can be elevated all the way or only partially elevated. The hatch cover 14 can even be partially elevated and partially tilted by toggling switches 32A and 32B to the up position for different periods of time.

In other words, many modifications and variations of the present invention are possible in light of the above teachings. It is therefore, to be understood that, within the scope of the appended claims, the invention may be practiced otherwise than as specifically described.

We claim:

1. A motorized vent and escape hatch assembly comprising:
    a substantially rectangular mounting ring for fastening to a vehicle roof,
    the rectangular mounting ring having rounded corners that protrude inwardly to provide four drive covers at the respective rounded corners,
    a substantially rectangular hatch cover,
    a first over center hinge linkage mechanism pivotally connecting a side of the hatch cover to the mounting ring,
    a second over center hinge linkage mechanism pivotally connecting an opposite side of the hatch cover to the mounting ring,
    each over center hinge linkage mechanism comprising first and second lever members pivotally connected to the mounting ring at one end for rotation between retracted and extended positions, the first and second lever members being spring biased toward their retracted and extended positions,
    a drive mechanism associated with each over center hinge linkage mechanism, each drive mechanism being disposed in two of the four drive covers for pivoting the first and second lever members toward or away from each other to raise or lower one side of the hatch cover with respect to the mounting ring,
    each drive mechanism having separate first and second drive units, and
    each drive unit having an electric motor and a gear set disposed in a respective one of the two of the four drive covers for driving a respective one of the first and second lever members.

2. A motorized vent and escape hatch assembly comprising:
    a mounting ring for fastening to a vehicle roof,
    a hatch cover,
    a first over center hinge linkage mechanism pivotally connecting a side of the hatch cover to the mounting ring, the first over center hinge linkage mechanism comprising first and second lever members pivotally connected to the mounting ring at one end, first and second plungers, the first and second lever members being pivotally connected to the respective first and second plungers at the opposite end, a tube connected to the hatch cover, the first and second plungers extending into the opposite ends of the tube, and a compression spring in the tube biasing the first and second plungers away from each other,
    a first drive mechanism for pivoting the first and second lever members toward or away from each other to raise or lower the side of the hatch cover with respect to the mounting ring,
    a second over center hinge linkage mechanism pivotally connecting an opposite side of the hatch cover to the mounting ring, the second over center hinge linkage mechanism comprising third and fourth lever members pivotally connected to the mounting ring at one end, third and fourth plungers, the third and fourth lever members being pivotally connected to the respective third and fourth plungers at the opposite end, a second tube connected to the hatch cover, the third and fourth plungers extending into the opposite ends of the second tube, and a second compression spring in the second tube biasing the third and fourth plungers away from each other,
    a second drive mechanism for pivoting the third and fourth lever members toward or away from each other to raise or lower the opposite side of the hatch cover with respect to the mounting ring,
    the first drive mechanism having first and second gear housings attached to the mounting ring at the one side, first and second gear sets disposed inside the respective gear housings, first and second electric motors attached to the respective gear housings for driving the first and second gear sets, the first and second gear sets driving respective first and second output shafts that extend out of the first and second gear housings, and the first and second lever members being keyed to the first and second output shafts respectively,
    the second drive mechanism having third and fourth gear housings attached to the mounting ring at the opposite side, third and fourth gear sets disposed inside the respective gear housings, third and fourth electric motors attached to the respective gear housings for driving the third and fourth gear sets, the third and fourth gear sets driving respective third and fourth output shafts that extend out of the third and fourth gear housings, and the third and fourth lever members being keyed to the third and fourth output shafts respectively,
    the first and second electric motors being attached to respective first sides of the respective gear housings and the first and second output shafts extending out of the respective first sides of the first and second gear housings and the third and fourth electric motors being attached to respective second sides of the respective gear housings and the third and fourth output shafts extending out of the respective second sides of the third and fourth gear housings.

3. A motorized vent and escape hatch assembly comprising:
    a mounting ring for fastening to a vehicle roof,
    a hatch cover,
    a first over center hinge linkage mechanism pivotally connecting a side of the hatch cover to the mounting ring, the first over center hinge linkage mechanism comprising first and second lever members pivotally connected to the mounting ring at one end, first and second plungers, the first and second lever members being pivotally connected to the respective first and second plungers at the opposite end, a tube connected to the hatch cover, the first and second plungers extending into the opposite ends of the tube, and a compression spring in the tube biasing the first and second plungers away from each other, a first drive mechanism for pivoting the first and second lever members toward or away from each other to raise or lower the side of the hatch cover with respect to the mounting ring, a second over center hinge linkage mechanism pivotally connecting an opposite side of the hatch cover to the mounting ring, the second over center hinge linkage mechanism comprising third and fourth lever members pivotally connected to the mounting ring at one end, third and fourth plungers, the third and fourth lever members being pivotally connected to the respective third and fourth plungers at the opposite end, a second tube connected to the hatch cover, the third and fourth plungers extending into the opposite ends of the second tube, and a second compression spring in the second tube biasing the third and fourth plungers away from each other, a second drive mechanism for pivoting the third and fourth lever members toward or away from each other to raise or lower the opposite side of the hatch cover with respect to the mounting ring, the first drive mechanism having first and second gear housings attached to the mounting ring at the one side, first and second gear sets disposed inside the respective gear housings, first and second electric motors attached to the respective gear housings for driving the first and second gear sets, the first and second gear sets driving respective first and second output shafts that extend out of the first and second gear housings, and the first and second lever members being keyed to the first and second output shafts respectively, the second drive mechanism having third and fourth gear housings attached to the mounting ring at the opposite side, third and fourth gear sets disposed inside the respective gear housings, third and fourth electric motors attached to the respective gear housings for driving the third and fourth gear sets, the third and fourth gear sets driving respective third and fourth output shafts that extend out of the third and fourth gear housings, and the third and fourth lever members being keyed to the third and fourth output shafts respectively, each gear housing having an outer side and each output shaft extending out of the outer side of its associated gear housing and each electric motor being attached to the outer side of its associated gear housing below the associated output shaft.

4. A motorized vent and escape hatch assembly comprising:

a mounting ring for fastening to a vehicle roof, a hatch cover, a first over center hinge linkage mechanism pivotally connecting a side of the hatch cover to the mounting ring, the first over center hinge linkage mechanism comprising first and second lever members pivotally connected to the mounting ring at one end for rotation between retracted and extended positions, the first and second lever members being spring biased toward their retracted and extended positions, a first drive mechanism for pivoting the first and second lever members in opposite directions with respect to each other to their extended or retracted positions to raise or lower the side of the hatch cover with respect to the mounting ring, a second over center hinge linkage mechanism pivotally connecting an opposite side of the hatch cover to the mounting ring, the second over center hinge linkage mechanism comprising third and fourth lever members pivotally connected to the mounting ring at one end for rotation between retracted and extended positions, the third and fourth lever members being spring biased toward their retracted and extended positions, a second drive mechanism for pivoting the third and fourth lever members in opposite directions with respect to each other to their extended or retracted position to raise or lower the opposite side of the hatch cover with respect to the mounting ring, the first drive mechanism having first and second gear housings attached to the mounting ring at the one side, first and second gear sets disposed inside the respective first and second gear housings, first and second electric motors attached to the respective gear housings for driving the first and second gear sets, the first and second gear sets driving respective first and second output shafts that extend out of the respective first and second gear housings, and the first and second lever members being keyed to the first and second output shafts respectively, the second drive mechanism having third and fourth gear housings attached to the mounting ring at the opposite side, third and fourth gear sets disposed inside the respective third and fourth gear housings, third and fourth electric motors attached to the respective gear housings for driving the third and fourth gear sets, the third and fourth gear sets driving respective third and fourth output shafts that extend out of the third and fourth gear housings, and the third and fourth lever members being keyed to the third and fourth output shafts respectively, the first and second electric motors being attached to respective first sides of the respective first and second gear housings and the first and second output shafts extending out of the respective first sides of the first and second gear housings, and the third and fourth electric motors being attached to respective second sides of the respective third and fourth gear housings and the third and fourth output shafts extending out of the respective second sides of the third and fourth gear housings.

5. A motorized vent and escape hatch assembly comprising:

a mounting ring for fastening to a vehicle roof, a hatch cover, a first over center hinge linkage mechanism pivotally connecting a side of the hatch cover to the mounting ring, the first over center hinge linkage mechanism comprising first and second lever members pivotally connected to the mounting ring at one end for rotation between retracted and extended positions, the first and second lever members being spring biased toward their retracted and extended positions, a first drive mechanism for pivoting the first and second lever members in opposite directions with respect to each other to their extended or retracted positions to raise or lower the side of the hatch cover with respect to the mounting ring, a second over center hinge linkage mechanism pivotally connecting an opposite side of the hatch cover to the mounting ring, the second over center hinge linkage mechanism comprising third and fourth lever members pivotally connected to the mounting ring at one end for rotation between retracted and extended positions, the third and fourth lever members being spring biased toward their retracted and extended positions, a second drive mechanism for pivoting the third and fourth lever members in opposite directions with respect to each other to their extended or retracted position to raise or lower the opposite side of the hatch cover with respect to the mounting ring, the first drive mechanism having first and second gear housings attached to the mounting ring at the one side, first and second gear sets disposed inside the respective first and second gear housings, first and second electric motors attached to the respective gear housings for driving the first and second gear sets, the first and second gear sets driving respective first and second output shafts that extend out of the respective first and second gear housings, and the first and second lever members being keyed to the first and second output shafts respectively, the second drive mechanism having third and fourth gear housings attached to the mounting ring at the opposite side, third and fourth gear sets disposed inside the respective third and fourth gear housings, third and fourth electric motors attached to the respective gear housings for driving the third and fourth gear sets, the third and fourth gear sets driving respective third and fourth output shafts that extend out of the third and fourth gear housings, and the third and fourth lever members being keyed to the third and fourth output shafts respectively, each gear housing having an outer side and each output shaft extending out of the outer side of its associated gear housing and each electric motor being attached to the outer side of its associated gear housing below the associated output shaft.

6. The motorized vent and escape hatch assembly as defined in claim 5, wherein the first, second, third and fourth gear sets are compound gear trains that reduce speed and increase torque.

7. A motorized vent and escape hatch assembly comprising:

a mounting ring for fastening to a vehicle roof, a hatch cover, an over center hinge linkage mechanism pivotally connecting a side of the hatch cover to the mounting ring, the first over center hinge linkage mechanism comprising first and second lever members pivotally connected to the mounting ring at one end for rotation between retracted and extended positions, the first and second lever members being spring biased toward their retracted and extended positions, a drive mechanism for rotating the first and second lever members in opposite directions with respect to each other to their extended or retracted positions to raise or lower the side of the hatch cover with respect to the mounting ring, and a second hinge linkage mechanism pivotally connecting an opposite side of the hatch cover to the mounting ring, the drive mechanism having first and second gear housings attached to the mounting ring at the one side, first and second gear sets disposed inside the respective first and second gear housings, first and second electric motors attached to the respective first and second gear housings for driving the first and second gear sets, the first and second gear sets driving respective first and second output shafts that extend out of the respective first and second gear housings, and the first and second lever members being keyed to the first and second output shafts respectively, the first and second electric motors being attached to respective first sides of the respective first and second gear housings and the first and second output shafts extending out of the respective first sides of the first and second gear housings.

8. A motorized vent and escape hatch assembly comprising:

a mounting ring for fastening to a vehicle roof, a hatch cover, an over center hinge linkage mechanism pivotally connecting a side of the hatch cover to the mounting ring, the first over center hinge linkage mechanism comprising first and second lever members pivotally connected to the mounting ring at one end for rotation between retracted and extended positions, the first and second lever members being spring biased toward their retracted and extended positions, a drive mechanism for rotating the first and second lever members in opposite directions with respect to each other to their extended or retracted positions to raise or lower the side of the hatch cover with respect to the mounting ring, and a second hinge linkage mechanism pivotally connecting an opposite side of the hatch cover to the mounting ring, the drive mechanism having first and second gear housings attached to the mounting ring at the one side, first and second gear sets disposed inside the respective first and second gear housings, first and second electric motors attached to the respective first and second gear housings for driving the first and second gear sets, the first and second gear sets driving respective first and second output shafts that extend out of the respective first and second gear housings, and the first and second lever members being keyed to the first and second output shafts respectively, each gear housing having an outer side and each output shaft extending out of the outer side of its associated gear housing and each electric motor being attached to the outer side of its associated gear housing below the associated output shaft.

9. The motorized vent and escape hatch assembly as defined in claim 7 wherein the first and second gear sets are compound gear trains that reduce speed and increase torque.

10. The motorized vent and escape hatch assembly as defined in claim 8 wherein the first and second gear sets are compound gear trains that reduce speed and increase torque.

* * * * *

UNITED STATES PATENT AND TRADEMARK OFFICE
CERTIFICATE OF CORRECTION

PATENT NO. : 6,572,182 B2
DATED : June 3, 2003
INVENTOR(S) : Ronald James Lamparter et al.

It is certified that error appears in the above-identified patent and that said Letters Patent is hereby corrected as shown below:

<u>Drawings,</u>
Fig 2 is missing #64

<u>Column 1,</u>
Line 39, after "to the" delete "filly" and insert -- fully --

Signed and Sealed this

Twenty-third Day of September, 2003

JAMES E. ROGAN
*Director of the United States Patent and Trademark Office*